United States Patent
Yuan et al.

(10) Patent No.: US 12,368,479 B2
(45) Date of Patent: Jul. 22, 2025

(54) METHOD, DEVICE AND COMPUTER READABLE MEDIUM FOR UPLINK CONTROL INFORMATION TRANSMISSION

(71) Applicant: NEC CORPORATION, Tokyo (JP)

(72) Inventors: Fang Yuan, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 271 days.

(21) Appl. No.: 17/596,549

(22) PCT Filed: Jun. 14, 2019

(86) PCT No.: PCT/CN2019/091355
§ 371 (c)(1),
(2) Date: Dec. 13, 2021

(87) PCT Pub. No.: WO2020/248247
PCT Pub. Date: Dec. 17, 2020

(65) Prior Publication Data
US 2022/0239362 A1    Jul. 28, 2022

(51) Int. Cl.
*H04B 7/06* (2006.01)
*H04B 7/0456* (2017.01)
(Continued)

(52) U.S. Cl.
CPC ......... *H04B 7/0695* (2013.01); *H04B 7/0456* (2013.01); *H04W 72/0453* (2013.01); *H04W 72/046* (2013.01); *H04W 72/21* (2023.01)

(58) Field of Classification Search
CPC .. H04B 7/0695; H04B 7/0456; H04B 7/0486; H04B 7/0697; H04B 7/0478; H04W 472/0453; H04W 472/046; H04W 472/21
See application file for complete search history.

(56) References Cited

U.S. PATENT DOCUMENTS

2018/0367196 A1    12/2018    Nammi et al.
2020/0162142 A1*    5/2020    Rahman ............... H04B 7/0639
(Continued)

FOREIGN PATENT DOCUMENTS

CN    109314559 A    2/2019
CN    109756985 A    5/2019
(Continued)

OTHER PUBLICATIONS

ZTE, "CSI Enhancement for MU-MIMO Support", 3GPP TSG RAN WG1 Meeting #97, 2019, R1-1906235, Reno, USA, May 13-17 (16 pages total).
(Continued)

*Primary Examiner* — Jianye Wu
(74) *Attorney, Agent, or Firm* — Sughrue Mion, PLLC

(57) ABSTRACT

Embodiments of the present disclosure relate to methods, devices and computer readable media for Uplink Control Information (UCI) transmission. In example embodiments, a method for communication includes determining, at a terminal device, a first part of a first codebook and a second part of a second codebook, the first part and the second part indicating presence or absence of gains for a plurality of pairs of spatial domain (SD) basis and frequency domain (FD) basis, the first codebook and the second codebook being used for different transmission layers between the terminal device and a network device; determining a bit sequence based on the first part and the second part, each bit in the bit sequence corresponding to one of the plurality of pairs of SD basis and FD basis; and transmitting, to the network device, uplink control information including the bit sequence.

4 Claims, 12 Drawing Sheets

(51) Int. Cl.
  *H04W 72/044* (2023.01)
  *H04W 72/0453* (2023.01)
  *H04W 72/21* (2023.01)

(56) References Cited

U.S. PATENT DOCUMENTS

2020/0177254 A1* 6/2020 Lee .................. H04B 7/063
2022/0239360 A1* 7/2022 Faxér ................ H04B 7/0478

FOREIGN PATENT DOCUMENTS

| CN | 109757127 A | 5/2019 | |
|---|---|---|---|
| WO | 2018/106017 A1 | 6/2018 | |
| WO | 2018/174636 A2 | 9/2018 | |
| WO | WO-2019069296 A1 * | 4/2019 | ........... H04B 7/0417 |

OTHER PUBLICATIONS

Extended European Search Report dated Sep. 30, 2022 in European Application No. 19932931.9.
Partial Supplementary Search Report issued Jun. 7, 2022 in European Application No. 19932931.9.
Ericsson, "On CSI omission procedure", 3GPP TSG RAN WG1 Meeting RAN1#97, R1-1907076, Reno, US, May 13-17, 2019 (6 pages total).
Fraunhofer IIS et al., "Enhancements on Type-II CSI reporting", 3GPP TSG-RAN WG1 AH-1901, R1-1901305, Taipei, Taiwan, Jan. 21-25, 2019 (18 pages total).
AT&T, "Remaining Issues in Multi TRP Transmission", 3GPP TSG RAN WG1 #97, R1-1907171, May 17, 2019, 21 pages.
"3rd Generation Partnership Project; Technical Specification Group Radio Access Network; Study on New Radio (NR) Access Technology; Physical Layer Aspects (Release 14)", 3GPP TR 38.802 V2.0.0, Mar. 2017, 134 pages.
International Search Report for PCT/CN2019/091355 dated Mar. 16, 2020 [PCT/ISA/210].
Written Opinion for PCT/CN2019/091355 dated Mar. 16, 2020 [PCT/ISA/237].
Office Action issued Apr. 9, 2025 in Chinese Patent Application No. 201980097474.3.

* cited by examiner

METHOD, DEVICE AND COMPUTER READABLE MEDIUM FOR UPLINK CONTROL INFORMATION TRANSMISSION

CROSS REFERENCE TO RELATED APPLICATIONS

This application is a National Stage of International Application No. PCT/CN2019/091355 filed Jun. 14, 2019.

TECHNICAL FIELD

Embodiments of the present disclosure generally relate to the field of communication, and in particular, to methods, devices and computer readable media for uplink control information (UCI) transmission.

BACKGROUND

Communication technologies have been developed in various communication standards to provide a common protocol that enables different wireless devices to communicate on a municipal, national, regional, and even global level. An example of an emerging communication standard is new radio (NR), for example, 5G radio access. NR is a set of enhancements to the Long Term Evolution (LTE) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

In the communication systems, generally Channel State Information (CSI) of a communication channel between a terminal device and a network device is estimated at the receiving terminal device and fed back to the network device to enable the network device to control transmission based on the current channel conditions indicated by the CSI. According to the NR technology, it has been proposed that channel properties for both wideband and subbands and for different beams (in MIMO systems) are to be reported in UCI, which results in a large overhead for transmission of UCI including the CSI.

SUMMARY

In general, example embodiments of the present disclosure provide methods, devices and computer readable media for UCI transmission.

In a first aspect, there is provided a method for communication. The method comprises determining, at a terminal device, a first part of a first codebook and a second part of a second codebook, the first part and the second part indicating presence or absence of gains for a plurality of pairs of spatial domain (SD) basis and frequency domain (FD) basis, the first codebook and the second codebook being used for different transmission layers between the terminal device and a network device; determining a bit sequence based on the first part and the second part, each bit in the bit sequence corresponding to one of the plurality of pairs of SD basis and FD basis; and transmitting, to the network device, uplink control information including the bit sequence.

In a second aspect, there is provided a method for communication. The method comprises receiving, at a network device, uplink control information including a bit sequence from a terminal device, each bit in the bit sequence corresponding to one of a plurality of pairs of spatial domain (SD) basis and frequency domain (FD) basis; and determining a first part of a first codebook and a second part of a second codebook based on the bit sequence, the first part and the second part indicating presence or absence of gains for the plurality of pairs of SD basis and FD basis, the first codebook and the second codebook being used for different transmission layers between the terminal device and the network device.

In a third aspect, there is provided a method for communication. The method comprises determining, at a terminal device from an ordered set of frequency domain (FD) basis, an intermediate set of FD basis for at least one transmission layer, the at least one transmission layer being configured for communication between the terminal device and a network device, the first FD basis in the ordered set of FD basis being included in the intermediate set; determining an indication indicating the intermediate set of FD basis based on a number of FD basis in the ordered set and a number of FD basis in the intermediate set; and transmitting, to the network device, uplink control information including the indication.

In a fourth aspect, there is provided a method for communication. The method comprises receiving, at a network device, uplink control information including an indication from a terminal device, the indication indicating an intermediate set of frequency domain (FD) basis determined by the terminal device from an ordered set of FD basis, the first FD basis in the ordered set of FD basis being included in the intermediate set; and determining the intermediate set of FD basis for at least one transmission layer based on the indication, a number of FD basis in the ordered set and a number of FD basis in the intermediate set, the at least one transmission layer being configured for communication between the terminal device and the network device.

In a fifth aspect, there is provided a method for communication. The method comprises obtaining, at a terminal device, a power threshold for a beam, the beam configured for communication between a terminal device and a network device; determining a power representation corresponding to the power threshold based on a plurality of amplitude coefficients for the beam over frequency domain; and determining values for the plurality of amplitude coefficients such that a power determined based on the power representation is below the power threshold.

In a sixth aspect, there is provided a terminal device. The terminal device includes a processor; and a memory coupled to the processing unit and storing instructions thereon, the instructions, when executed by the processing unit, causing the terminal device to perform the method according to the first aspect.

In a seventh aspect, there is provided a network device. The network device includes a processor; and a memory coupled to the processing unit and storing instructions thereon, the instructions, when executed by the processing unit, causing the network device to perform the method according to the second aspect.

In an eighth aspect, there is provided a terminal device. The terminal device includes a processor; and a memory coupled to the processing unit and storing instructions thereon, the instructions, when executed by the processing unit, causing the terminal device to perform the method according to the third aspect.

In a ninth aspect, there is provided a network device. The network device includes a processor; and a memory coupled to the processing unit and storing instructions thereon, the instructions, when executed by the processing unit, causing the network device to perform the method according to the fourth aspect.

In a tenth aspect, there is provided a terminal device. The terminal device includes a processor; and a memory coupled to the processing unit and storing instructions thereon, the instructions, when executed by the processing unit, causing the terminal device to perform the method according to the fifth aspect.

In an eleventh aspect, there is provided a computer readable medium having instructions stored thereon, the instructions, when executed on at least one processor, causing the at least one processor to carry out the method according to the first aspect.

In a twelfth aspect, there is provided a computer readable medium having instructions stored thereon, the instructions, when executed on at least one processor, causing the at least one processor to carry out the method according to the second aspect.

In a thirteenth aspect, there is provided a computer readable medium having instructions stored thereon, the instructions, when executed on at least one processor, causing the at least one processor to carry out the method according to the third aspect.

In a fourteenth aspect, there is provided a computer readable medium having instructions stored thereon, the instructions, when executed on at least one processor, causing the at least one processor to carry out the method according to the fourth aspect.

In a fifteenth aspect, there is provided a computer readable medium having instructions stored thereon, the instructions, when executed on at least one processor, causing the at least one processor to carry out the method according to the fifth aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
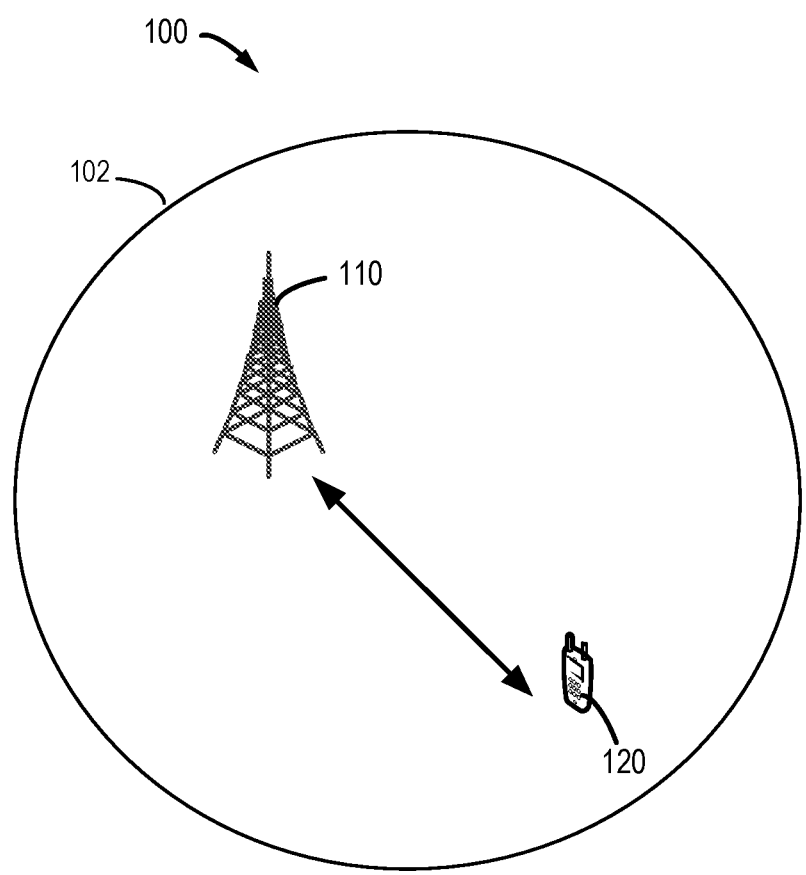
FIG. 1 is a schematic diagram of a communication environment in which embodiments according to some aspects of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In NR Release 15, the codebook defined for transmission using one beam is referred to as a type I codebook. A terminal device reports CSI for one beam, and subband parameters are reported. When available resources are not enough to transmit the CSI, the terminal device may discard some of CSI per subband. For example, parameters related to even subbands may be discarded first.

Recently, in NR, the terminal device is required to report CSI for more than one beam (for example, L beams) and the corresponding codebook is referred to as a type II codebook, which is enhanced by frequency domain compression. Unlike the type I codebook, there is no subband parameter according to the enhanced type II codebook. Therefore, there is a need to handle UCI transmission for the enhanced type II codebook, including omission and compression of the overhead for CSI report.

Embodiments of the present disclosure provide a solution for UCI transmission, in order to solve the above problems and one or more of other potential problems. Principle and implementations of the present disclosure will be described in detail below with reference to FIGS. 1-13.

FIG. 1 shows an example communication network 100 in which implementations of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The network 100 may include any suitable number of network devices and terminal devices adapted for implementing implementations of the present disclosure. Although not shown, it is to be understood that one or more terminal devices may be located in the cell 102 and served by the network device 110.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In communications, the terminal device 120 is configured to estimate and report CSI of a communication channel between the terminal device 120 and the network device 110. The CSI can be determined by the terminal device 120 using downlink reference signals transmitted by the network device 110. After performing channel estimation between the network device 110 and the terminal device 120 across a predetermined frequency range for a plurality of beams having different spatial directions, the terminal device 120 may determine the CSI to be reported to the network device 110. The CSI report will be transmitted as a part of UCI using uplink resources, for example, be included in uplink data channel, such as physical uplink shared channel (PUSCH).

To better understand the example embodiments of the present disclosure, the enhanced type II codebook is described first. As used herein, a transmission layer may also be referred to as a layer for brevity, for example, layer 1, layer 2, layer 3 and layer 4. The space-frequency matrix W for a layer r can be represented by the following equation (1):

$$W = W_1 \tilde{W}_2^{(r)} W_f^{(r)H} \quad (1)$$

If R layers are indicated by the terminal device 120, the equation (1) may be expressed as:

$$W = [W_1 \tilde{W}_2^{(1)} W_f^{(1)H}, W_1 \tilde{W}_2^{(2)} W_f^{(2)H}, \ldots, W_1 \tilde{W}_2^{(R)} W_f^{(R)H}] \quad (2)$$

where R may be equal to 1, . . . , $R_{max}$ and $R_{max}$ is configured by the network device 110. $W_1$ and $W_f^{(r)}$ are composed of bases selected from a set of spatial domain (SD) basis and a set of frequency domain (FD) basis, respectively. The dimension of the coefficient matrix $\tilde{W}_2^{(r)}$ is 2 L×M, with L and M as the number of selected SD basis and FD basis, respectively.

$W_1$, which is layer common, can be expressed as:

$$W_1 = \begin{bmatrix} v_0 v_1 \ldots v_{L-1} & 0 \\ 0 & v_0 v_1 \ldots v_{L-1} \end{bmatrix} \quad (3)$$

The selection of SD basis $\{v_l\}_{l=0}^{L-1}$ is common for any layer r. For example, the L SD bases may be selected from a group of $N_1 N_2 \times 1$ orthogonal Discrete Fourier Transform (DFT) vectors. Additionally, there may be $O_1 O_2$ groups of DFT vectors, and an oversampling factor is used to select one group out of all the $O_1 O_2$ groups.

$W_f^{(r)}$, which is layer specific, can be expressed as:

$$W_f^{(r)} = [f_{k_0}^{(r)} f_{k_1}^{(r)} \ldots f_{k_{M-1}}^{(r)} - \mathbf{1}^{(r)}] \quad (4)$$

The selection of FD basis $\{f_{k_m}^{(r)}\}_{m=0}^{M_r-1}$ is specific to each layer r. For example, the $M_r$ FD bases may be selected from $N_3\times1$ orthogonal DFT vectors, and the index $k_i$ applies to $1\leq k_i\leq N_3$ for $i=0, \ldots, M_r-1$.

The coefficient matrix $\tilde{W}_2^{(r)}$ can be expressed as:

$$\tilde{W}_2^{(r)} = E^{(r)} \odot \begin{bmatrix} p_0^{(ref)}\tilde{P}_0^{(r)}\tilde{\Phi}_0^{(r)} & \\ & p_1^{(ref)}\tilde{P}_1^{(r)}\tilde{\Phi}_1^{(r)} \end{bmatrix} \quad (5)$$

where $E^{(r)}$ indicates whether there is a gain for a pair of SD and FD basis; $\tilde{P}_i^{(r)}=\{p_{l,m}^{(r)}\}_{l\in[1,\ldots,L], m\in[1,\ldots,M_r]}$ represents an amplitude of a gain for a pair of SD basis $v_l$ and FD basis $f_{k_m}^{(r)}$, $\tilde{\Phi}_i^{(r)}=\{\varphi_{l,m}^{(r)}\}_{l\in[1,\ldots,L],m\in[1,\ldots,M_r]}$ represents a phase of a gain for a pair of SD basis $v_l$ and FD basis $f_{k_m}^{(r)}$. $p_0^{(ref)}\tilde{P}_0^{(r)}\tilde{\Phi}_0^{(r)}$ and $p_1^{(ref)}\tilde{P}_1^{(r)}\tilde{\Phi}_1^{(r)}$ represent two different polarizations. $p_0^{(ref)}$ and $p_1^{(ref)}$ are the reference amplitudes of strongest coefficient indicators (SCI) for the two polarizations, respectively, and may be reported to the network device 110.

As a part of a codebook for the layer r, $E^{(r)}$ may be represented as a matrix with a dimension of $2 L\times M_r$ and may be indicated by a bitmap of $2 LM_r$ in the CSI report. Each element of $E^{(r)}$ corresponds to a pair of SD basis $v_l$ and FD basis $f_{k_m}^{(r)}$. An element with a value of "1" for example may indicate the presence of a gain for the pair of SD basis $v_l$ and FD basis $f_{k_m}^{(r)}$, and thus may correspond to an amplitude coefficient and a phase coefficient (which may be collectively referred to as non-zero coefficients) to be reported to the network device 110. An element with a value of "0" for example may indicate the absence of a gain for the pair of SD basis $v_l$ and FD basis $f_{k_m}^{(r)}$.

There is a need to define how to report $E^{(r)}$ for different layers in the form of bitmap, such that the network device after receiving the CSI report can reconstruct the $E^{(r)}$ for different layers. Moreover, when some non-zero coefficients need to be discarded from the UCI, the terminal device 120 may discard the non-zero coefficients based on the positions of the corresponding bits in the bitmap and the network device 110 may be aware of non-zero coefficients for which pair(s) of SD basis and FD basis have been discarded.

Figure 2:
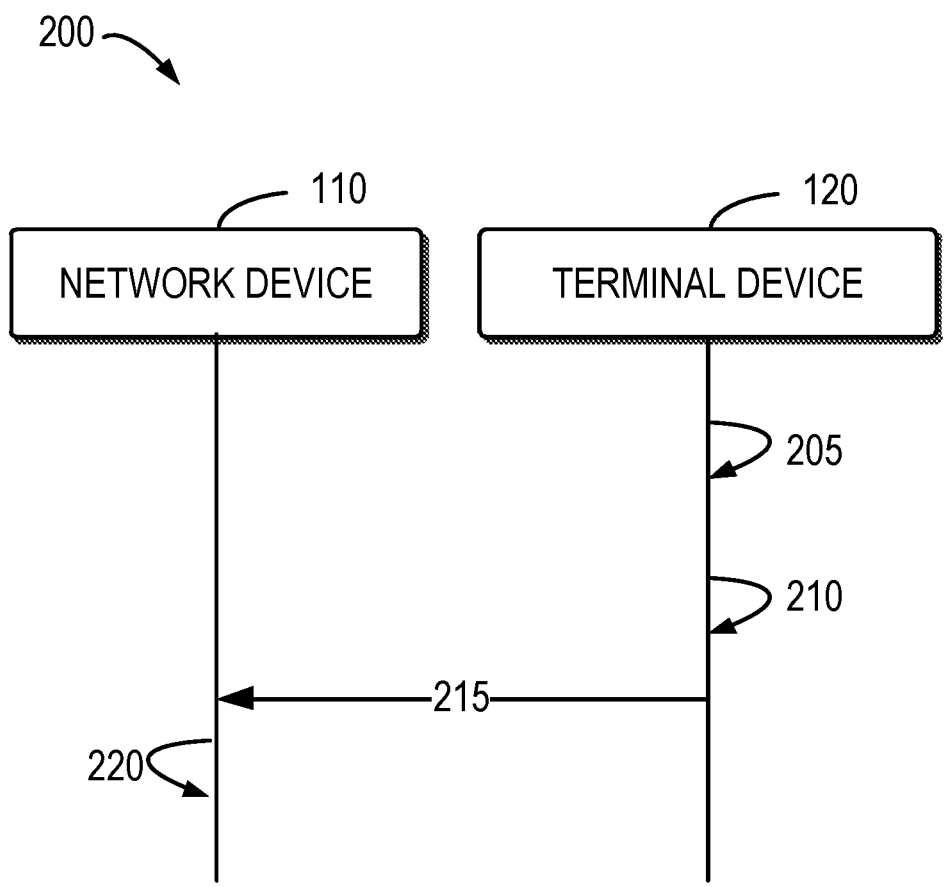
FIG. 2 is a schematic diagram illustrating a process for UCI transmission according to some embodiments of the present disclosure.

FIG. 2 is a schematic diagram illustrating a process 200 for UCI transmission according to some embodiments of the present disclosure. For purpose of discussion, the process 200 will be described with reference to FIG. 1. The terminal device 120 determines 205 a first part of a first codebook and a second part of a second codebook. The first part and the second part indicate presence or absence of gains for a plurality of pairs of SD basis and FD basis. The first codebook and the second codebook are used for different transmission layers between the terminal device 120 and a network device 110.

For example, after channel state estimation, the terminal device 120 may determine $E^{(r)}$ as shown in the equation (5) for each layer r, such as $E^{(1)}$ for layer 1, $E^{(2)}$ for layer 2, and $E^{(3)}$ for layer 3, etc. As used herein, $E^{(1)}$ may also be referred to as the first part, and $E^{(2)}$ may also be referred to as the second part, and so on. An element of $E^{(r)}$ may be represented by (r, l, f), where r represents the index of the corresponding layer, l represents the SD basis to which the element corresponds and f represents the FD basis to which the element corresponds.

When $E^{(r)}$ is organized as a matrix, l and f correspond to the row index and the column index of the element, respectively. The elements of $E^{(r)}$ may take a value of "0" or "1" and each element with a value of "1" may correspond to a gain for the respective pair of SD basis and FD basis, i.e. may correspond to a pair of amplitude coefficient and phase coefficient which are expected to be reported to the network device 110.

Then, the terminal device 120 determines 210 a bit sequence based on the first part and the second part. Each bit in the bit sequence corresponds to one of the plurality of pairs of SD basis and FD basis. For example, the terminal device 120 may generate a bitmap based on the $E^{(r)}$ for each layer r. In the case of two layers, the terminal device 120 may generate the bitmap based on the first part $E^{(1)}$ and the second part $E^{(2)}$.

In some example embodiments, the bit sequence may be determined directly based on the first part and the second part (in some cases, a further part) as originally determined by the terminal device 120. For example, the terminal device 120 may interleave first elements of the first part and second elements of the second part, and generate the bit sequence based on the interleaved first elements and second elements.

In some example embodiments, the terminal device 120 may first adjust the first part and the second part, and generate the bit sequence based on the adjusted first part and second part. If the first part is a first matrix and the second part is a second matrix, the terminal device 120 may perform adjustment or transformation on the matrices. For example, the terminal device 120 may first adjust a column of the first matrix and a column of the second matrix, and generate the bit sequence based on the adjusted first matrix and the adjusted second matrix.

Now examples of how to generate the bit sequence will be detailed with reference to FIGS. 3 and 4. Before generating the bit sequence, the $E^{(r)}$ may be adjusted first. In some example embodiments, the adjustment or transformation of $E^{(r)}$ may be performed on the columns, which may correspond to FD basis indices. The columns of $E^{(r)}$ may be adjusted in a variety of ways.

In some example embodiments, a column intervening the first column and the original last column may be shifted to the last column of $E^{(r)}$. That is, FD basis indices with moderate values may be placed into the last column of $E^{(r)}$. As an example, a particular column with a predefined gap from the first or last column may be shifted to the last column first. That is, FD basis indices with a particular value other than "0" or "$M_r-1$" may be placed into the last column of $E^{(r)}$.

Figure 3A:
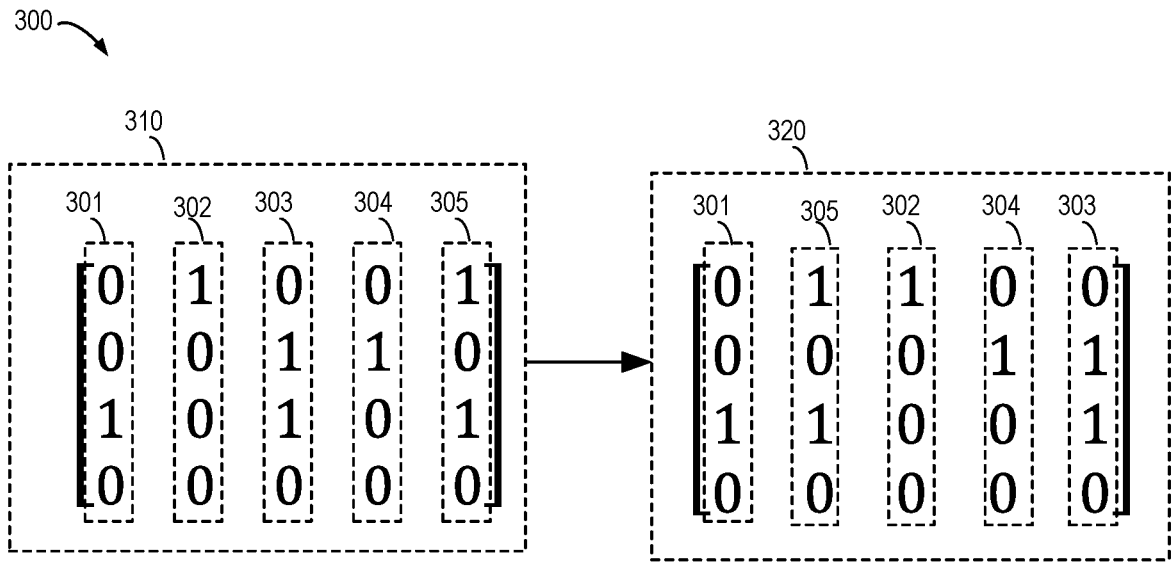
FIG. 3A shows a schematic diagram illustrating adjustment of a matrix according to some embodiments of the present disclosure.

Reference is now made to FIG. 3A, which shows a schematic diagram 300 illustrating an adjustment of a matrix 310 according to some embodiments of the present disclosure. The matrix 310 is an example of $E^{(r)}$ for layer r. FIG. 3A shows a specific example of the adjustment or transformation of $E^{(r)}$ without any limitation.

For example, the middle column with a column index of ceil $$\left(\frac{M_r}{2}\right)$$

may be shifted to the last column. Then, the columns adjacent to the middle column may be shifted. For example, the column with a column index of ceil $$\left(\frac{M_r}{2}\right)+1$$

may be shifted to the second to last column and the column with a column index of ceil $$\left(\frac{M_T}{2}\right) - 1$$

may be shifted to the third to last column and so on.

For the example shown in FIG. 3A, the matrix 310 has five columns 301-305. In the adjusted matrix 320, the column 303 occupies the last column, the column 304 occupies the second to last column and the column 302 occupies the third to last column. In such example embodiments, the position of the first column 301 may be maintained.

In some cases where the strongest coefficient indicator is aligned, the amplitude coefficient(s) corresponding to the non-zero element(s) in the middle column may be smaller than the amplitude coefficient(s) corresponding to the non-zero element(s) in the edge column. As such, if there is a pair of non-zero coefficients needed to be discarded, the amplitude coefficient with the smallest value may be discarded first. See further description below.

Figure 3B:
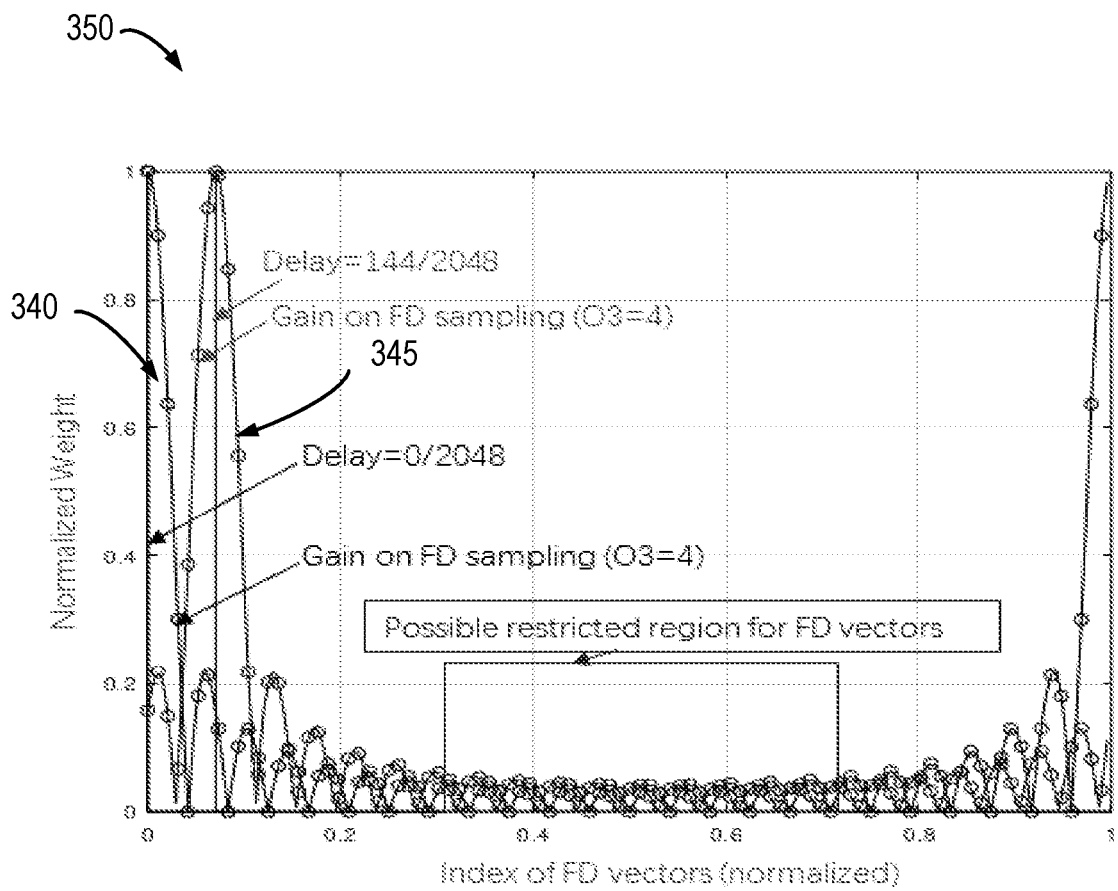
FIG. 3B shows a schematic diagram illustrating the technical effect according to some embodiments of the present disclosure.

FIG. 3B shows a schematic diagram 350 illustrating the technical effect of such example embodiments. The relationships between gains (weight) and FD basis indices are shown for channels before (corresponding to line 345 as shown in FIG. 3B) and after (corresponding to line 340 as shown in FIG. 3B) the strongest coefficient is aligned to the first column. When the strongest coefficient is aligned to the first column, the gains corresponds to both the first several FD basis indices and the last several FD basis indices are large, while the ones corresponds to the other FD basis indices are small. By shifting the FD basis indices with moderate values to the last columns, the corresponding smaller gains can be discarded first, which avoids discarding the large gains corresponding to the first and last several FD basis before the adjustment.

Figure 3C:
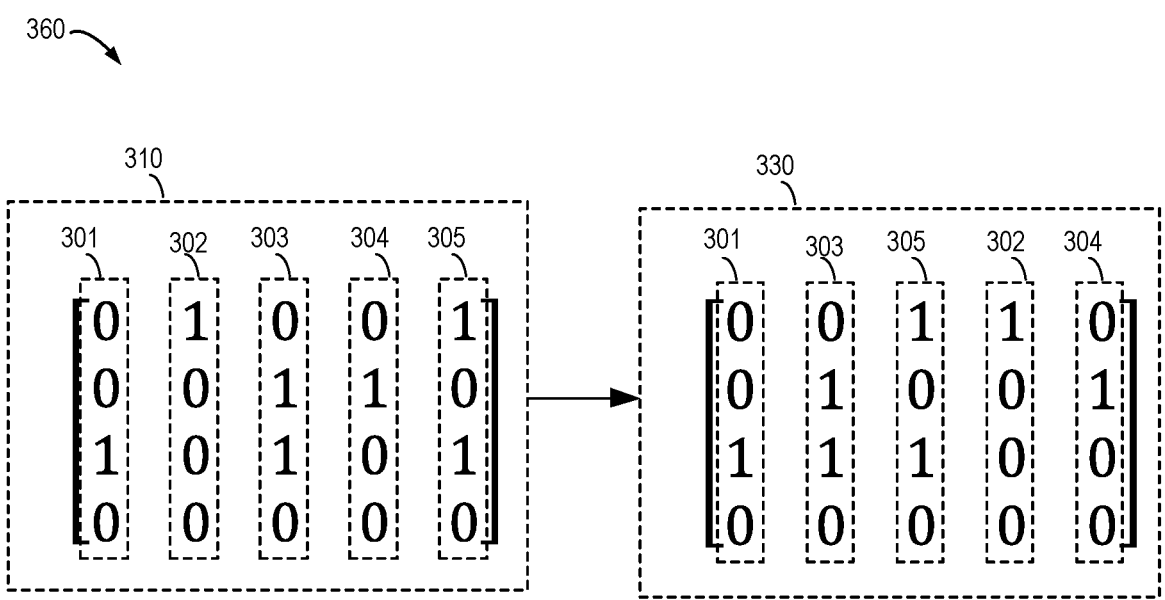
FIG. 3C shows a schematic diagram illustrating adjustment of a matrix according to some embodiments of the present disclosure.

Reference is now made to FIG. 3C, which shows a schematic diagram 360 illustrating adjustment of a matrix 310 according to some other embodiments of the present disclosure. The matrix 310 is an example of $E^{(r)}$ for layer r.

Before generating the bit sequence, the $E^{(r)}$ may be adjusted first. In some example embodiments, the adjustment of $E^{(r)}$ may be performed on the columns, based on the column indices. For example, positions of columns of the matrix $E^{(r)}$ may be adjusted such that the columns with even indices 2i are placed following the columns with odd indices 2 i+1 in the adjusted matrix, where the value of i is in a range from $$\left(\frac{M_T}{2}\right)$$

to 1. As such, the column with the maximum column index may be shifted the last column.

For the example shown in FIG. 3C, the matrix 310 has five columns 301-305. In the adjusted matrix 330, the column 304 occupies the last column, the column 302 occupies the second to last column and the column 305 occupies the third to last column. In such example embodiments, the position of the first column 301 may be maintained.

In such example embodiments, if there is a pair of non-zero coefficients needed to be discarded, the amplitude coefficient(s) corresponding to the non-zero element(s) in the column 304 may be discarded first and then the amplitude coefficient(s) corresponding to the non-zero element(s) in the column 302. The amplitude coefficient(s) corresponding to the non-zero element(s) in the first column 301 may have the least possibility to be discarded.

Similar adjustment may be performed on the rows of $E^{(r)}$. Although the adjustment on $E^{(r)}$ is described with respect to a particular matrix, it is to be understood that the same adjustment may be performed on each $E^{(r)}$. The above adjustment described with reference to FIGS. 3A and 3B is only for purpose of illustration without any limitation.

An element of $E^{(r)}$, which is represented by (r, l, f) before the adjustment, may be represented by for example (r̃, l̃, f̃) after the adjustment. For the example shown in FIGS. 3A and 3B, adjustments are performed on the columns, i.e. over the frequency domain. Thus, an element may be represented by (r, l, f̃) after the adjustment.

Figure 4A:
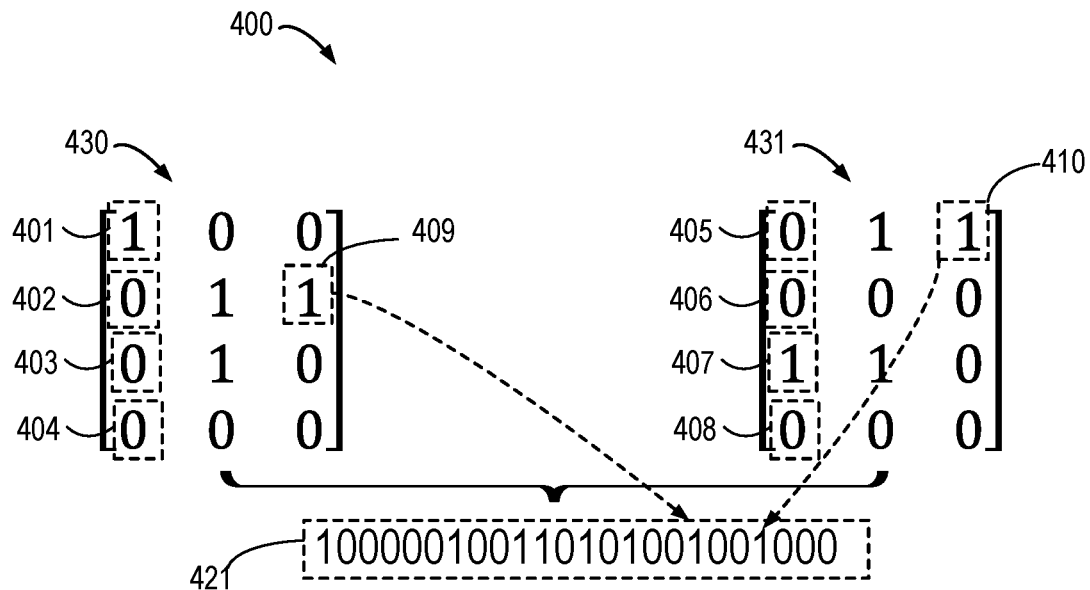
FIG. 4A shows a schematic diagram illustrating generation of a bitmap according to some embodiments of the present disclosure.
Figure 4B:
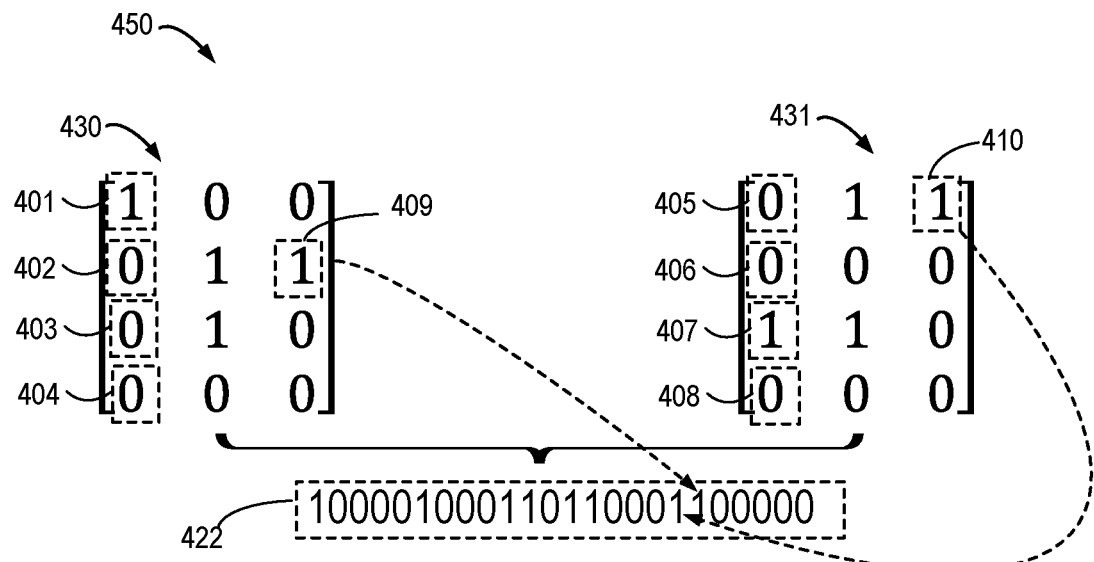
FIG. 4B shows a schematic diagram illustrating generation of a bitmap according to some embodiments of the present disclosure.

Now reference is made to FIGS. 4A and 4B to illustrate how to convert $E^{(r)}$ into a bit sequence, for example, a bitmap. FIG. 4A shows a schematic diagram 400 illustrating generation of a bitmap 421 according to some embodiments of the present disclosure; FIG. 4B shows a schematic diagram 450 illustrating generation of a bitmap 422 according to some embodiments of the present disclosure.

To convert $E^{(r)}$ for the layer(s) into a bit sequence, particularly interleaving elements of $E^{(r)}$ for the different layers, a mapping rule may be predefined. For an element (r, l, f), there are indices of three dimensions, that is, the layer, spatial domain and the frequency domain. The following equations (6)-(11) are examples of mapping rules that may be employed.

$$p(r,l,f) = r + R(l-1) + 2LR(f-1) \tag{6}$$

$$p(r,f,l) = r + R(f-1) + M_rR(l-1) \tag{7}$$

$$p(l,r,f) = l + 2L(r-1) + 2LR(f-1) \tag{8}$$

$$p(l,f,r) = l + 2L(f-1) + 2LM_r(r-1) \tag{9}$$

$$p(f,r,l) = f + M_r(r-1) + M_rR(l-1) \tag{10}$$

$$p(f,l,r) = f + M_r(l-1) + 2LM_r(r-1) \tag{11}$$

where p represents the position of the bit corresponding to the element (r, l, f).

In the example shown in FIG. 4A, a mapping rule as defined in the equation (8) is applied to the matrix 430 and the matrix 431, which may be examples of $E^{(1)}$ and $E^{(2)}$, respectively. As a result, in the bitmap 421 generated based on the matrix 430 and the matrix 431, bits corresponding to the elements 401-404 occupy the first position to the fourth position, while bits corresponding to the elements 405-405 occupy the fifth position to the eighth position, and so on.

In the example shown in FIG. 4B, a mapping rule as defined in the equation (6) is applied to the matrix 430 and the matrix 431, which may be examples of $E^{(1)}$ and $E^{(2)}$, respectively. As a result, in the bitmap 422 generated based on the matrix 430 and the matrix 431, the bit corresponding to the elements 401 occupies the first position, the bit corresponding to the elements 405 occupies the second position, the bit corresponding to the elements 402 occupies the third position, the bit corresponding to the elements 406 occupies the fourth position, the bit corresponding to the elements 403 occupies the fifth position, the bit corresponding to the elements 407 occupies the sixth position, the bit corresponding to the elements 404 occupies the seventh position, while the bit corresponding to the elements 401 occupies the eighth position, and so on.

It is to be understood that the matrix shown in FIGS. 4A and 4B are just examples of $E^{(r)}$ without any limitation. The mapping of $E^{(r)}$ to a bitmap may be applied to any number of matrices with any suitable number of columns and rows. It is also to be noted that although the equations (6)-(11) are expressed with (r, l, f), the mapping rules may be applied in the same manner to the $E^{(r)}$ after conversion. In other words, (r, l, f) in the equations (6)-(11) may be replace by ($\tilde{r}$, $\tilde{l}$, $\tilde{f}$).

Now reference is made back to FIG. 2. The terminal device 120 transmits 215, to the network device 110, uplink control information including the bit sequence. For example, the terminal device 120 may transmit the bitmap 421 to the network device 110 as a part of CSI.

In some example embodiments, before the transmission of UCI, the terminal device 120 may determine whether the UCI is suitable for transmitting with available uplink resources. If the terminal device 120 determines that the UCI is unsuitable for transmitting with the available uplink resources, a portion of the CSI may be discarded or dropped (since for example there may be other information with a higher priority than the CSI). For example, if the terminal device 120 determines that the available resources for UCI is not enough to carry the CSI report or the actual coding rate is larger than the coding rate threshold, at least a portion of the CSI may be discarded by the terminal device 120. In such a case, the terminal device 120 may need to discard the amplitude coefficient and phase coefficient for at least one pair of SD basis and FD basis.

A position-based discarding may be employed. For example, the terminal device 120 may discard the amplitude coefficient and phase coefficient from the end of the bit sequence. The amplitude coefficient and phase coefficient corresponding to the last bit with a predefined value (for example, "1") may be discarded first.

For the example shown in FIG. 4A, the last bit of 1 in the bitmap 421 correspond to the element 410 of the matrix 431 and the second to last bit of 1 in the bitmap 421 correspond to the element 409 of the matrix 430. In this example, the amplitude coefficient and phase coefficient corresponding to the element 410 will be discarded first. If more coefficients need to be discarded, the terminal device 120 may further discard the amplitude coefficient and phase coefficient corresponding to the element 409. The discarding of the coefficients may be continued in this way until the available uplink resources are suitable for transmitting the remaining portion of the UCI.

For the example shown in FIG. 4B, the last bit of 1 in the bitmap 422 correspond to the element 409 of the matrix 430 and the second to last bit of 1 in the bitmap 422 correspond to the element 410 of the matrix 431. In this example, the amplitude coefficient and phase coefficient corresponding to the element 409 will be discarded first. If more coefficients need to be discarded, the terminal device 120 may further discard the amplitude coefficient and phase coefficient corresponding to the element 410. The discarding of the coefficients may be continued in this way until the available uplink resources are suitable for transmitting the remaining portion of the UCI.

Now reference is made back to FIG. 2. Upon receiving of the UCI, the network device 110 determines 220 the first part of the first codebook and the second part of the second part based on the received bit sequence. For example, the network device 110 may receive the bitmap 421 and determine the matrix 430 and the matrix 431 from the bitmap 421. The determination of the matrix 430 and the matrix 431 may also be based on other parameters include in the CSI report.

To determine or reconstruct $E^{(r)}$ for each layer r, the same adjustment and mapping rules may be known by both the terminal device 120 and the network device 110. Thus, the network device 110 may determine or reconstruct $E^{(r)}$ by a reversal process as described above with reference to FIGS. 3 and 4. The network device 110 may de-interleave bits in the bit sequence into different matrices. For example, the network device 110 may de-interleave the bits in the bitmap 421 by applying the mapping rule as shown in the equation (8).

It is to be noted that the discarding rules described above may also be known by the network device 110 such that upon receiving of CSI report, the network device 110 may determine a codeword from the type II CSI codebook.

To reduce the overhead for CSI transmission and thus the UCI transmission, two-step FD basis selection may be implemented to compress CSI. In this two-step FD basis selection, an intermediate set of FD basis may be first determined and selection of FD basis for each layer may then be indicated based on the intermediate set of FD basis. Therefore, there is a need to define how to indicate the intermediate set of FD basis to the network device. Such embodiments will be described below with respect to FIGS. 5-7.

Figure 5:
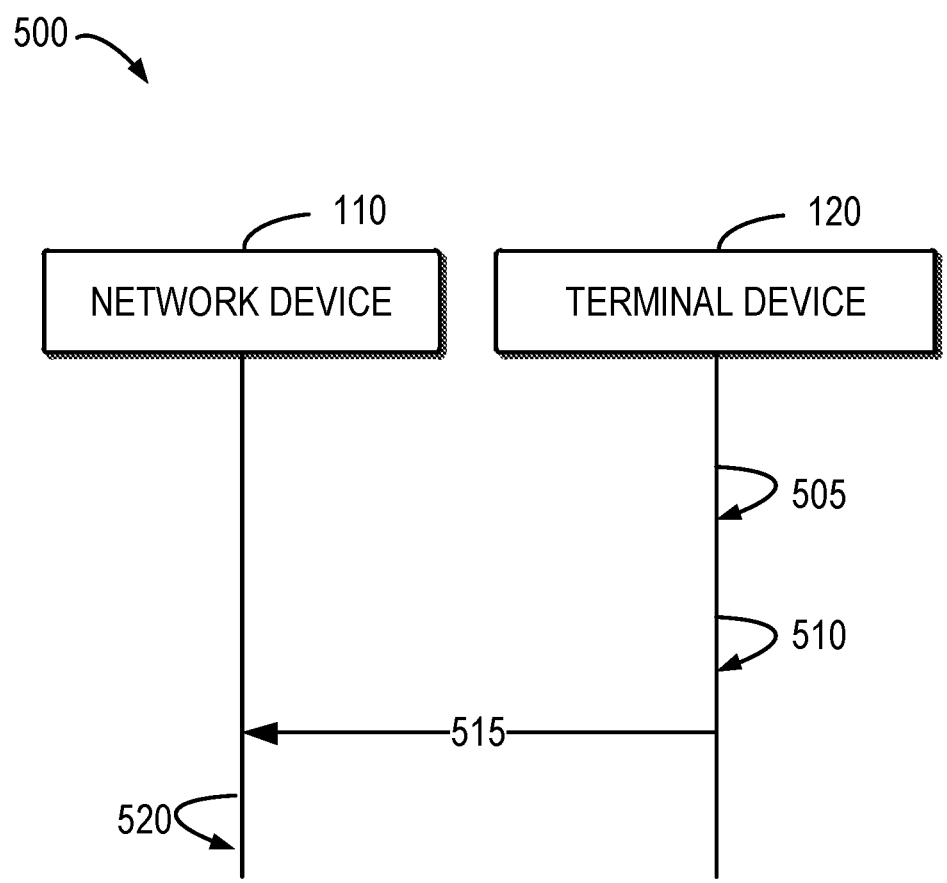
FIG. 5 is a schematic diagram illustrating a process for indicating an intermediate set of FD basis according to some embodiments of the present disclosure.

FIG. 5 is a schematic diagram illustrating a process 500 for indicating an intermediate set of FD basis according to some embodiments of the present disclosure. The terminal device 120 determines 505, from an ordered set of FD basis (for example DFT vectors as described above), an intermediate set of FD basis for at least one transmission layer. The at least one transmission layer is used for communication between the terminal device 120 and the network device 110. To ensure the SCI is aligned with the first column of the coefficient matrix $\tilde{W}_2^{(r)}$, the first FD basis in the ordered set of FD basis is included in the intermediate set.

The number of FD basis in the intermediate set may be represented by $N_3'$ herein. The number of FD basis in the ordered set of FD basis from which the intermediate set of FD basis is selected may be represented by $N_3$. Such an intermediate set of FD basis may be considered as a window. If there is only one layer, the intermediate set may be determined based on the FD basis selected by the particular layer.

In some example embodiments, the terminal device 120 may determine, from the ordered set of FD basis, a first ordered subset of FD basis for a first transmission layer and a second ordered subset of FD basis for a second transmission layer. The first transmission layer is different from the second transmission layer. Then, the terminal device 120 may determine the intermediate set of FD basis based on a union of the first ordered subset of FD basis and the second ordered subset of FD basis.

Figure 6:
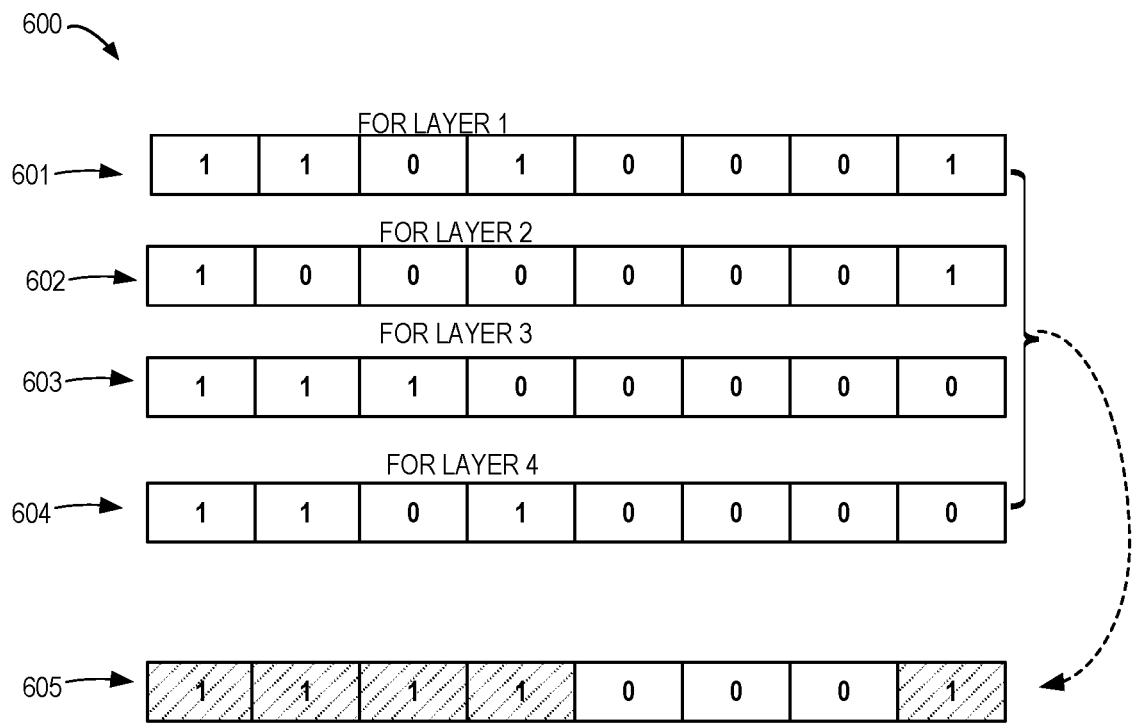
FIG. 6 shows a schematic diagram illustrating FD basis selection according to some embodiments of the present disclosure.

Such an example is described with reference to FIG. 6. FIG. 6 shows a schematic diagram 600 illustrating FD basis selection according to some embodiments of the present disclosure. Only for purpose of illustration without any limitation, selection of FD basis is shown by way of a bitmap. In the example shown in FIG. 6, the bitmaps 601-604 represent the subset of FD basis selected for layers 1-4, respectively. The bitmap 605 represents a union set of FD basis that covers a union of the subset of FD basis for each of layers 1-4. For the bitmap 605, with a starting point at $M^{initial}$ and a size $N_3'$, the FD basis in this union set is given by indices $\mathrm{mod}(M^{initial}+n, N_3)$, $n=0, 1, \ldots, N_3'-1$.

If the size $N_3'$ of the intermediate set is fixed, then the indication indicating the starting point $M^{initial}$ of the window may be reported in a compact way. Still referring to FIG. 5, the terminal device 120 determines 510 an indication indicating the intermediate set of FD basis based on a number of FD basis in the ordered set and a number of FD basis in the intermediate set. For example, the terminal device 120 may determine the indication for $M^{initial}$ based on the values of $N_3$ and $N_3'$.

Figure 7:
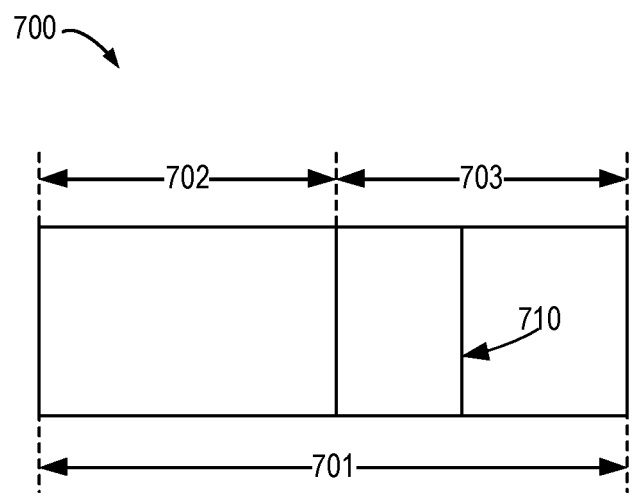
FIG. 7 shows a schematic diagram illustrating a starting point according to some embodiments of the present disclosure.

Such an example is now described with reference to FIG. 7. FIG. 7 shows a schematic diagram 700 illustrating a starting point according to some embodiments of the present disclosure. The length 701 represents the number $N_3$ and the length 702 represents $N_3-N_3'$. Since the first FD basis of the ordered set of FD basis should be included in the intermediate set and the number $N_3'$ is fixed, the position representation 710 for the starting point $M^{initial}$ of the window may be limited within the region 703. Therefore, the starting point may be expressed as:

$$M^{initial} = \mod(0-i, N3) \qquad (12)$$

where i has a value in the range from 0 to $N_3'-1$.

The value of i may be determined by the terminal device 120 as an indication of the intermediate set of FD basis and reported to the network device 110. Still referring to FIG. 5. The terminal device 120 transmits 515, to the network device 110, uplink control information including the indication of $M^{initial}$. For example, the terminal device 120 may transmit the determined i in the UCI part 1 to the network device 110. The terminal device 120 may further report the FD basis for each layer in the UCI part 2.

In such example embodiments, the bit width for transmitting the indication of may be determined as $\text{ceil}(\log_2 N'_3)$. As compared to the bit width of $\text{ceil}(\log_2 N_3)$ where the number of FD basis in the intermediate set is not fixed, the overhead for reporting the starting point is $M^{initial}$ reduced.

Upon receiving the indication, for example, i, the network device 110 determines 520 the intermediate set of FD basis for at least one transmission layer based on the indication, a number of FD basis in the ordered set ($N_3$) and a number of FD basis in the intermediate set ($N_3'$). For example, the network device 110 may determine the staring point $M^{initial}$ of the window using the equation (12).

When the terminal device 120 determines the codebook for example as shown in equation (1), codebook subset restriction (CBSR) may be applied to determine the parameters required by the codebook. For example, the maximum power constraint may be applied to determine the amplitude coefficients for the coefficient matrix $\tilde{W}_2$. For a particular layer r, the coefficient matrix $\tilde{W}_2$ may be further expressed as:

determine the value of each amplitude coefficient $p_{diff}(l, m)$, where l is from 0 to 2L and m is from 0 to M−1. In this way, the power of a certain SD beam may be restricted. Such embodiments will be described with reference to FIG. 8.

Figure 8:
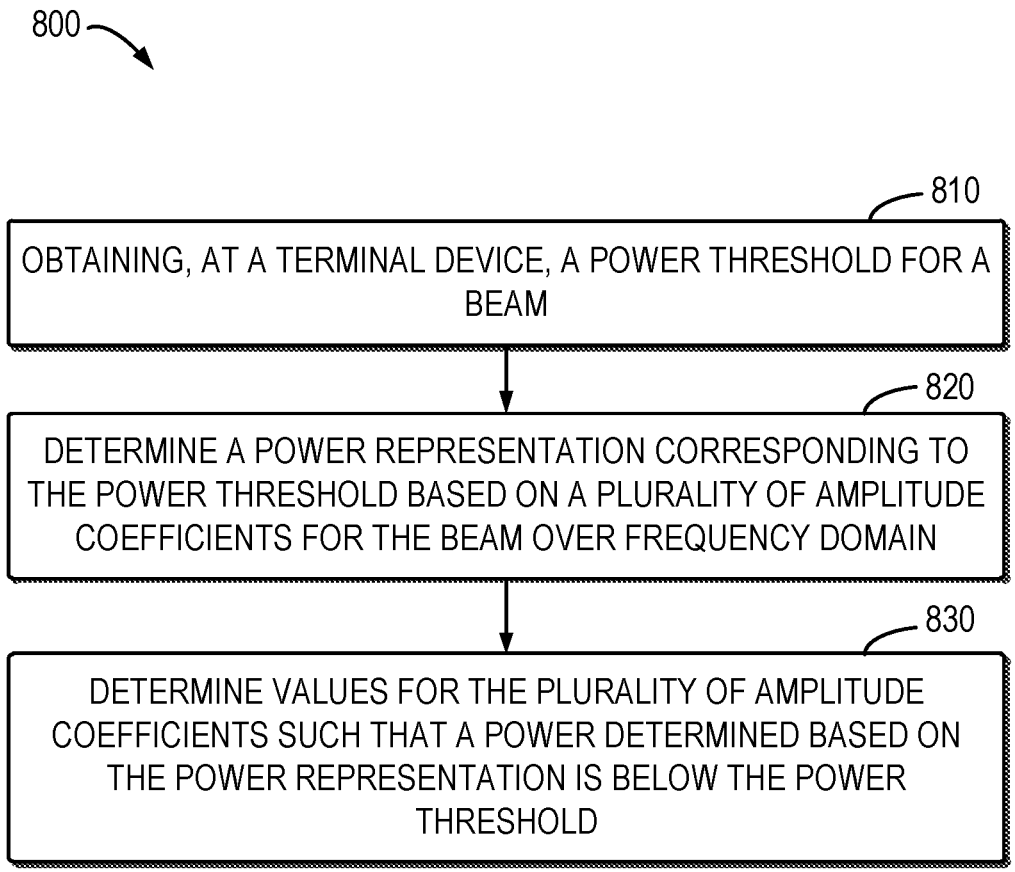
FIG. 8 shows a flowchart of an example method in accordance with some embodiments of the present disclosure.

FIG. 8 shows a flowchart of an example method 800 in accordance with some embodiments of the present disclosure. The method 800 can be implemented at for example the terminal device 120 shown in FIG. 1. It is to be understood that the method 800 may include additional blocks not shown and/or may omit some blocks as shown, and the scope of the present disclosure is not limited in this regard. For the purpose of discussion, the method 800 will be described with reference to FIG. 1.

At block 810, the terminal device 120 obtains a power threshold for a beam. The beam is configured for communication between the terminal device 120 and the network device 110. The power threshold, for example the maximum power, may be configured by a higher layer and the terminal device 120 may obtain the power threshold by receiving a higher layer signaling. The terminal device 120 may determine the power threshold in any suitable manner.

In some example embodiments, the power threshold may be separately configured for each layer r. In such example embodiments, the power threshold may be represented as $P_{max,r,l}$. In some example embodiments, the power threshold may be configured for all the layers. In such example embodiments, the power threshold may be represented as $P_{max,l}$.

At block 820, the terminal device 120 determines a power representation corresponding to the power threshold based on a plurality of amplitude coefficients for the beam over frequency domain. The power representation may be determined separately for each layer in some example embodiments. In some other embodiments, the power representation may be determined based on amplitude coefficients corresponding to each of the transmission layers.

At block 830, the terminal device 120 determines values for the plurality of amplitude coefficients such that a power determined based on the power representation is below the power threshold. In the example embodiments where the maximum power constraint is applied per layer, the following equations (14) and (15) may be satisfied.

$$\sqrt{\sum_{m=0}^{M-1} p_{diff}^2(l,m)} \leq P_{max,r,l} \qquad (14)$$

$$\sqrt{\sum_{m=0}^{M-1} p_{ref}^2 p_{diff}^2(l,m)} \leq P_{max,r,l} \qquad (15)$$

For the equation (14), l is from 0 to L−1, while for the equation (15), l is from L to 2 L−1. The terminal device 120 may determine the values of the amplitude coefficients $p_{diff}(l, m)$ such that both the equations (14) and (15) are $$\tilde{W}_2 = \begin{bmatrix} p_{diff}(0,0)q(0,0) & p_{diff}(0,1)q(0,1) & \cdots & p_{diff}(0,M-1)q(0,M-1) \\ \vdots & \vdots & \cdots & \vdots \\ p_{diff}(L-1,0)q(L-1,0) & p_{diff}(L-1,1)q(L-1,1) & \cdots & p_{diff}(L-1,M-1)q(L-1,M-1) \\ p_{ref}p_{diff}(L,0)q(L,0) & p_{ref}p_{diff}(L,1)q(L,1) & \cdots & p_{ref}p_{diff}(L,M-1)q(L,M-1) \\ \vdots & \vdots & \cdots & \vdots \\ p_{ref}p_{diff}(2L-1,0)q(2L-1,0) & p_{ref}p_{diff}(2L-1,1)q(2L-1,1) & \cdots & p_{ref}p_{diff}(2L-1,M-1)q(2L-1,M-1) \end{bmatrix} \qquad (13)$$

Although not shown in the equation (13), the parameter M may be equivalent to "$M_r$" as discussed above. The terminal device 120 may apply a maximum power constraint to satisfied for each layer. The values of the amplitude coefficients $p_{diff}(l, m)$ may be selected from a plurality of predetermined values.

In the example embodiments where the maximum power constraint is applied across all the layers, the following equations (16) and (17) may be satisfied.

$$\sqrt{\Sigma_{r=0}^{R-1}\Sigma_{m=0}^{M-1}p_{diff}^2(l,m)} < P_{max,r,l} \quad (16)$$

$$\sqrt{\Sigma_{r=0}^{R-1}\Sigma_{m=0}^{M-1}p_{ref}^2 p_{diff}^2(l,m)} < P_{max,r,l} \quad (17)$$

For the equation (16), l is from 0 to L−1, while for the equation (17), l is from L to 2 L−1. The terminal device 120 may determine the values of the amplitude coefficients $p_{diff}(l, m)$ such that both the equations (16) and (17) are satisfied. The values of the amplitude coefficients $p_{diff}(l, m)$ may be selected from a plurality of predetermined values.

Figure 9:
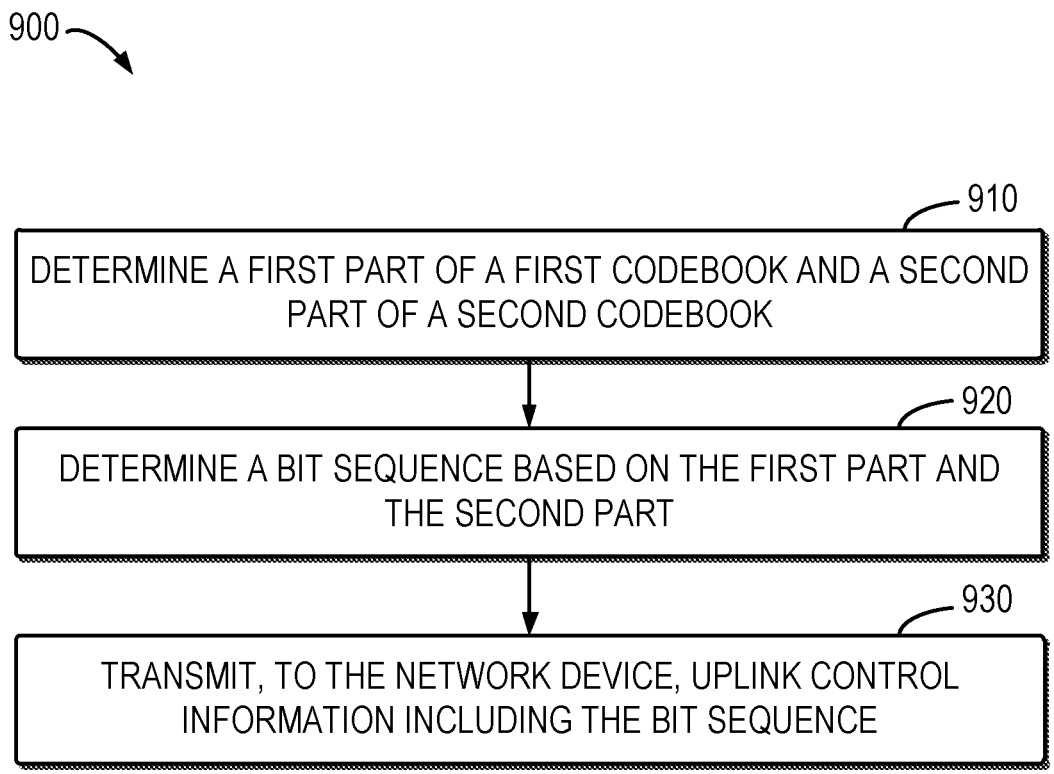
FIG. 9 shows a flowchart of an example method in accordance with some embodiments of the present disclosure.

FIG. 9 shows a flowchart of an example method 900 in accordance with some embodiments of the present disclosure. The method 900 can be implemented at for example the terminal device 120 shown in FIG. 1. It is to be understood that the method 1000 may include additional blocks not shown and/or may omit some blocks as shown, and the scope of the present disclosure is not limited in this regard. For the purpose of discussion, the method 1000 will be described with reference to FIG. 1.

At block 910, the terminal device 120 determines a first part of a first codebook and a second part of a second codebook. The first part and the second part indicate presence or absence of gains for a plurality of pairs of spatial domain (SD) basis and frequency domain (FD) basis, and the first codebook and the second codebook are used for different transmission layers between the terminal device 120 and a network device 110.

At block 920, the terminal device 120 determines a bit sequence based on the first part and the second part, each bit in the bit sequence corresponding to one of the plurality of pairs of SD basis and FD basis.

In some embodiments, determining the bit sequence comprises: interleaving first elements of the first part and second elements of the second part; and generating the bit sequence based on the interleaved first elements and second elements.

In some embodiments, the first part is a first matrix and the second part is a second matrix, and determining the bit sequence comprises: adjusting a column of the first matrix and a column of the second matrix; and generating the bit sequence based on the adjusted first matrix and the adjusted second matrix.

In some embodiments, adjusting the column of the first matrix comprises: determining an intermediate column of the first matrix and a further column adjacent to the intermediate column, the intermediate column intervening the first column and the last column of the first matrix; shifting the intermediate column to the last column of the first matrix; and placing the further column adjacent to the shifted intermediate column.

In some embodiments, adjusting the column of the first matrix comprises: determining, from the first matrix, even columns with even column indices and odd columns with odd column indices; and placing the even columns following the odd columns.

At block 930, the terminal device 120 transmits, to the network device 110, uplink control information including the bit sequence.

In some embodiments, the method 900 further comprises determining whether the uplink control information is suitable for transmitting with available uplink resources; in response to a determination that the uplink control information is unsuitable for transmitting with the available uplink resources, determining the last bit with a predefined value in the bit sequence; determining a gain for a pair of SD basis and FD basis corresponding to the last bit; and discarding, from the uplink control information, an indication of the gain for the pair of SD basis and FD basis.

Figure 10:
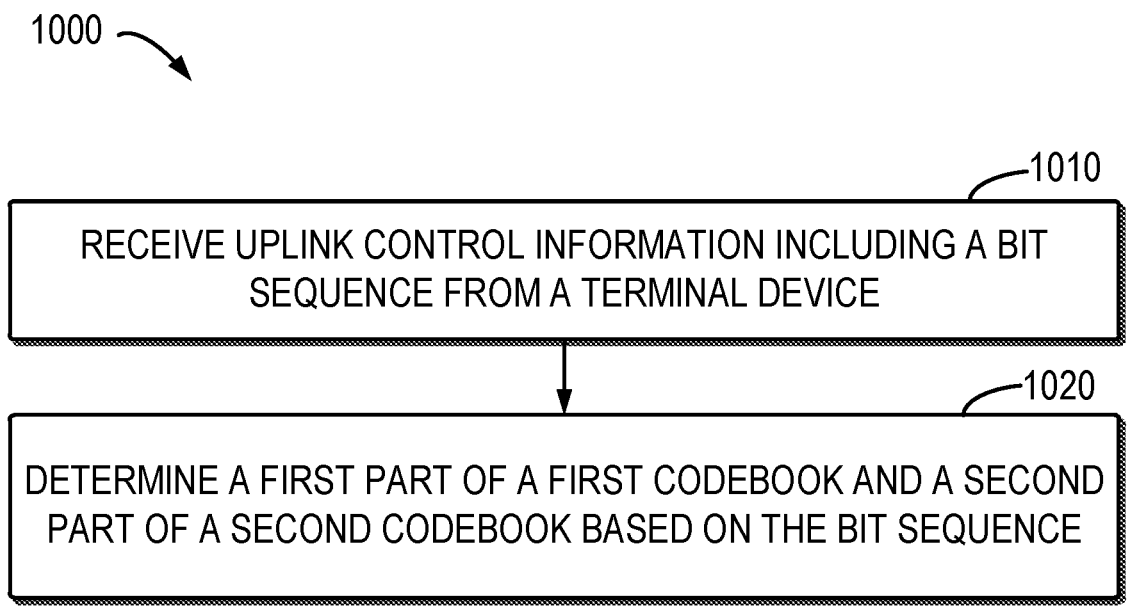
FIG. 10 shows a flowchart of an example method in accordance with some embodiments of the present disclosure.

FIG. 10 shows a flowchart of an example method 1000 in accordance with some embodiments of the present disclosure. The method 1000 can be implemented at for example the network device 110 shown in FIG. 1. It is to be understood that the method 1000 may include additional blocks not shown and/or may omit some blocks as shown, and the scope of the present disclosure is not limited in this regard. For the purpose of discussion, the method 1000 will be described with reference to FIG. 1.

At block 1010, the network device 110 receives uplink control information including a bit sequence from a terminal device 120. Each bit in the bit sequence corresponds to one of a plurality of pairs of spatial domain (SD) basis and frequency domain (FD) basis.

At block 1020, the network device 110 determines a first part of a first codebook and a second part of a second codebook based on the bit sequence. The first part and the second part indicate presence or absence of gains for the plurality of pairs of SD basis and FD basis. The first codebook and the second codebook are used for different transmission layers between the terminal device 120 and the network device 110.

In some embodiments, determining the first part and the second part comprises: de-interleaving bits in the bit sequence into first bits corresponding to the first part and second bits corresponding to the second parts; and determining the first part and the second part based on the first bits and the second bits.

In some embodiments, the first part is a first matrix and the second part is a second matrix, and determining the bit sequence comprises: generating a first intermediate matrix and a second intermediate matrix based on the bit sequence; adjusting a column of the first intermediate matrix and a column of the second intermediate matrix; and determining the adjusted first intermediate matrix as the first part and the adjusted second intermediate matrix as the second part.

Figure 11:
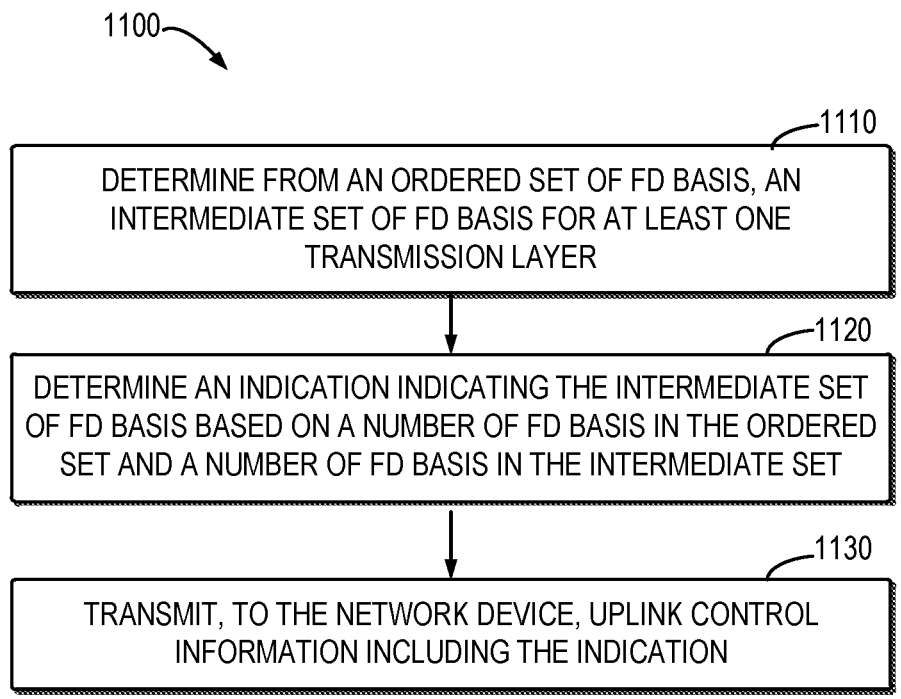
FIG. 11 shows a flowchart of an example method in accordance with some embodiments of the present disclosure.

FIG. 11 shows a flowchart of an example method 1100 in accordance with some embodiments of the present disclosure. The method 1100 can be implemented at for example the terminal device 120 shown in FIG. 1. It is to be understood that the method 1100 may include additional blocks not shown and/or may omit some blocks as shown, and the scope of the present disclosure is not limited in this regard. For the purpose of discussion, the method 1100 will be described with reference to FIG. 1.

At block 1110, the terminal device 120 determines from an ordered set of frequency domain (FD) basis, an intermediate set of FD basis for at least one transmission layer. The at least one transmission layer is configured for communication between the terminal device 120 and a network device 110. The first FD basis in the ordered set of FD basis is included in the intermediate set.

At block 1120, the terminal device 120 determines an indication indicating the intermediate set of FD basis based on a number of FD basis in the ordered set and a number of FD basis in the intermediate set.

In some embodiments, determining the intermediate set of FD basis comprises: determining, from the ordered set of FD basis, a first ordered subset of FD basis for a first transmission layer and a second ordered subset of FD basis for a second transmission layer, the first transmission layer being different from the second transmission layer; and determining the intermediate set of FD basis based on a union of the first ordered subset of FD basis and the second ordered subset of FD basis.

At block 1130, the terminal device 120 transmits, to the network device 110, uplink control information including the indication. In some embodiments, a size of a resource for transmitting the indication is determined based on the number of FD basis in the intermediate set.

Figure 12:
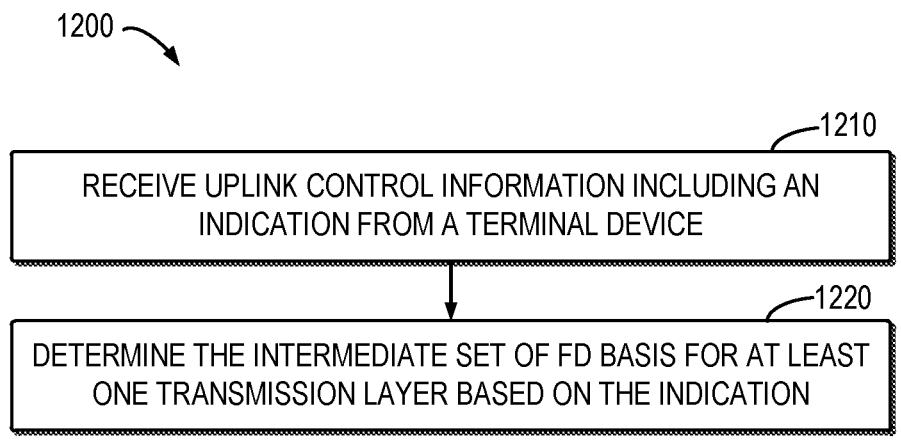
FIG. 12 shows a flowchart of an example method in accordance with some embodiments of the present disclosure.

FIG. 12 shows a flowchart of an example method 1200 in accordance with some embodiments of the present disclosure. The method 1200 can be implemented at for example the network device 110 shown in FIG. 1. It is to be understood that the method 1200 may include additional blocks not shown and/or may omit some blocks as shown, and the scope of the present disclosure is not limited in this regard. For the purpose of discussion, the method 1200 will be described with reference to FIG. 1.

At block 1210, the network device 110 receives uplink control information including an indication from a terminal device 120. The indication indicating an intermediate set of frequency domain (FD) basis determined by the terminal device 120 from an ordered set of FD basis. The first FD basis in the ordered set of FD basis is included in the intermediate set.

At block 1220, the network device 110 determines the intermediate set of FD basis for at least one transmission layer based on the indication, a number of FD basis in the ordered set and a number of FD basis in the intermediate set. The at least one transmission layer is configured for communication between the terminal device 120 and the network device 110.

Figure 13:
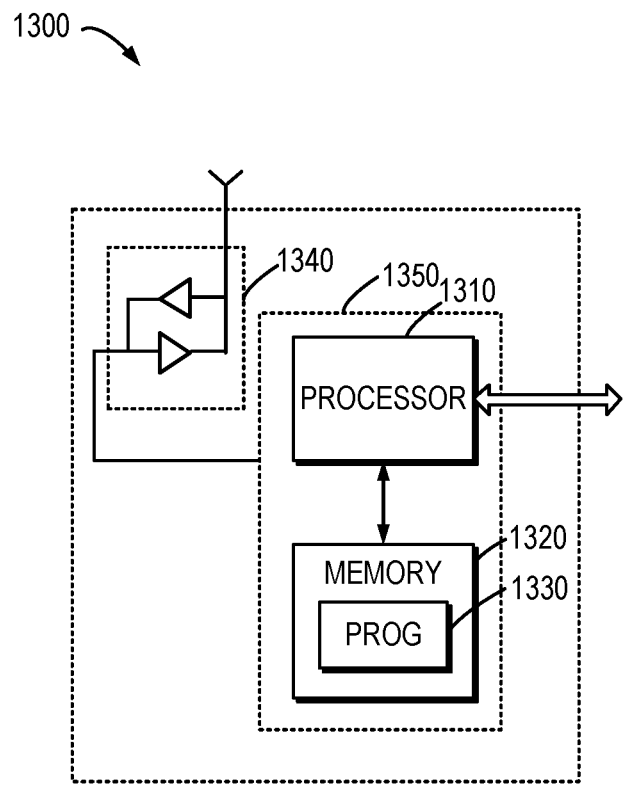
FIG. 13 is a simplified block diagram of a device that is suitable for implementing embodiments of the present disclosure.

FIG. 13 is a simplified block diagram of a device 1300 that is suitable for implementing embodiments of the present disclosure. The device 1300 can be considered as a further example implementation of the network device 110 or the terminal device 120 as shown in FIG. 1. Accordingly, the device 1300 can be implemented at or as at least a part of the network device 110 or the terminal device 120.

As shown, the device 1300 includes a processor 1310, a memory 1320 coupled to the processor 1310, a suitable transmitter (TX) and receiver (RX) 1340 coupled to the processor 1310, and a communication interface coupled to the TX/RX 1340. The memory 1310 stores at least a part of a program 1330. The TX/RX 1340 is for bidirectional communications. The TX/RX 1340 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1330 is assumed to include program instructions that, when executed by the associated processor 1310, enable the device 1300 to operate in accordance with the embodiments of the present disclosure, as discussed herein with reference to FIGS. 8-12. The embodiments herein may be implemented by computer software executable by the processor 1310 of the device 1300, or by hardware, or by a combination of software and hardware. The processor 1310 may be configured to implement various embodiments of the present disclosure. Furthermore, a combination of the processor 1310 and memory 1310 may form processing means 1350 adapted to implement various embodiments of the present disclosure.

The memory 1310 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1310 is shown in the device 1300, there may be several physically distinct memory modules in the device 1300. The processor 1310 may be of any type suitable to the local technical network, and may include one or more of general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2, 5, 8-12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
   determining a Channel State Information (CSI) report based on a codebook with a first number of frequency domain (FD) basis vectors; and
   transmitting the CSI report on physical uplink shared channel (PUSCH),
   wherein the CSI report omits a portion of CSI based on indices of the FD basis vectors, and the CSI report indicates a starting point and the starting point is limited to a configured range,
   wherein a coefficient amplitude associated with the indices of the FD basis vectors is restricted to be smaller than a configured maximum amplitude.

2. The method of claim 1, wherein the portion of CSI is omitted based on order of the indices of the FD basis vectors.

3. A terminal device comprising:
   a processor configured to cause the terminal device to:
   determine a Channel State Information (CSI) report based on a codebook with a first number of frequency domain (FD) basis vectors; and
   transmit the CSI report on physical uplink shared channel (PUSCH),
   wherein the CSI report omits a portion of CSI based on indices of the FD basis vectors, and the CSI report indicates a starting point and the starting point is limited to a configured range,
   wherein a coefficient amplitude associated with the indices of the FD basis vectors is restricted to be smaller than a configured maximum amplitude.

4. The terminal device of claim 3, wherein the portion of CSI is omitted based on order of the indices of the FD basis vectors.

* * * * *